Jan. 22, 1963  W. DEUSCHEL ETAL  3,074,950
PROCESS FOR PRODUCING A MODIFICATION OF GAMMA
7,14-DIOXO-5,7,12,14-TETRAHYDROQUINOLINO-(2,3-b)
ACRIDINE
Filed Aug. 16, 1960
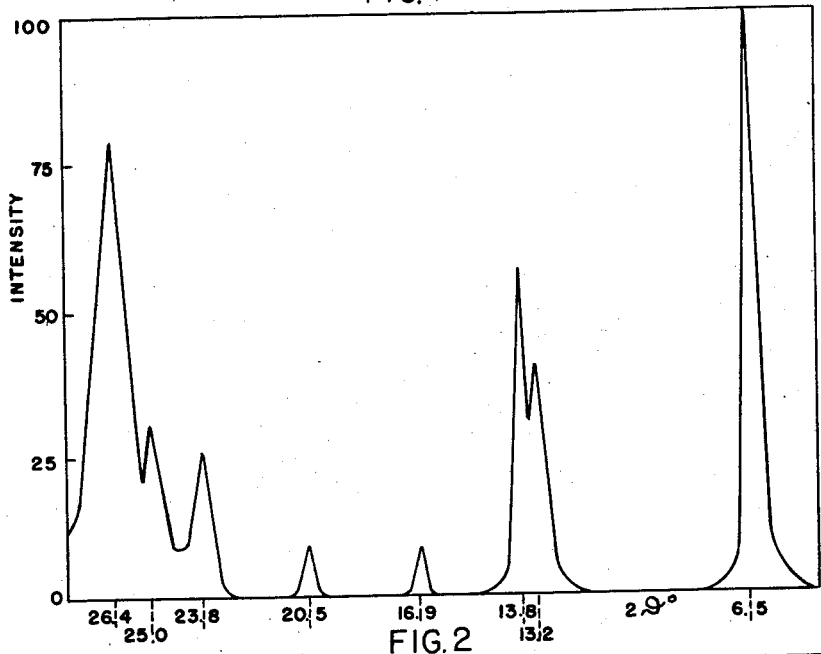
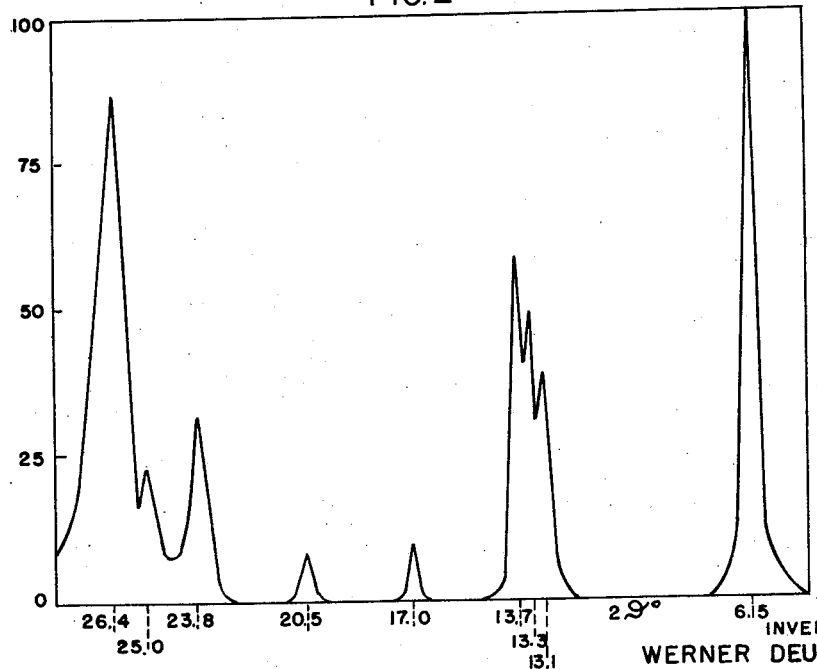
INVENTORS:
WERNER DEUSCHEL
FRIEDRICH GUNDEL
HANNS WUEST
EWALD DAUBACH
BY Marzall, Johnston, Cook & Root
ATT'YS

United States Patent Office 3,074,950
Patented Jan. 22, 1963

3,074,950
PROCESS FOR PRODUCING A MODIFICATION OF GAMMA 7,14 - DIOXO - 5,7,12,14-TETRAHYDRO-QUINOLINO-(2,3-b) ACRIDINE
Werner Deuschel, Friedrich Gundel, and Hanns Wuest, Ludwigshafen (Rhine), and Ewald Daubach, Ludwigshafen (Rhine), Oppau, Germany, assignors to Badische Anilin- & Soda-Fabrik Aktiengesellschaft, Ludwigshafen (Rhine), Germany
Filed Aug. 16, 1960, Ser. No. 49,906
Claims priority, application Germany Aug. 22, 1959
7 Claims. (Cl. 260—279)

Three modifications of 7,14-dioxo-5,7,12,14-tetrahydroquinolino-(2,3-b)-acridine (linear-trans-quinacridone):

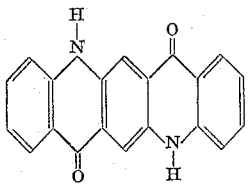

are known, which are designated as alpha-, beta- and gamma-modifications. These modifications are suitable as red pigment dyes. They have good fastness, but their shades are bluish red and violet and brilliance and hiding power leave much to be desired. There was therefore the problem of finding a red pigment dye which would have the yellowish red shade especially desired in many cases. Such a yellowish-red pigment dye must also have good general fastness, high tinctorial strength and good hiding power.

The object of this invention is a yellowish-red pigment dye of the quinacridone series which has good fastness, high purity of shade, superior hiding power and high brilliance.

This yellowish-red pigment dye is a new form of the gamma-modification of linear-trans-quinacridone whose physical characteristics are three powerful lines in the X-ray diffraction pattern at a double glancing angle of 6.5°, 13.7° and 26.4°, three medium lines at 13.1°, 13.3° and 23.8° and three weak lines at 17.0°, 20.5° and 25.0°. With pigments of the new form there are achieved at an average mean primary particle size of more than 0.1 micron, preferably 0.3 to 0.7 micron, and a specific surface of less than about 30 square meters per gram, preferably about 20 square meters per gram, pigmented systems of excellent brilliance, high color fastness and excellent hiding power. It is above all the excellent purity of shade and especially the more yellowish tinge of the new form which surprise the observer when comparing it with the known form of the gamma-modification which is duller in shade. Comparison of the X-ray patterns and infra-red spectra of the two forms similarly reveals clear differences, even when their particles are present in the same order of magnitude.

In X-ray diffraction patterns (compare FIGURE I of the accompanying drawing which reproduces the X-ray spectrum of the old form of the gamma-modification with FIGURE II which reproduces the X-ray spectrum of the new form of the gamma-modification) there is at a double glancing angle of 23.8° in the new form a line of medium intensity and in the old form a line of weak intensity and conversely at 25.0° in the new form a line of weak intensity and in the old form a line of medium intensity. The new form moreover has two lines of medium intensity at 13.1° and 13.3° and a line of high intensity at 13.7°. In contrast, the old form has in this range only a line of medium intensity at 13.2° and a line of high intensity at 13.8°. In the infra-red spectrum of the new form there is, in contrast with the old form, no line at 13.35 microns. The new form is therefore not merely a pigment with improved properties, but a new pigment which is characterized by a yellowish red shade, hiding power, good general fastness, above all excellent fastness to light and weathering, and resistance to high temperatures. It is not attacked by solvents or softeners.

Pigmented systems which contain the new pigment as a component of mixtures of substances, possibly in addition to other components, include: pastes, flush pastes, preparations, printing colors, distempers, binder colors or lacquers and varnishes of all kinds, such as physically and oxidatively drying lacquers and varnishes, acid, amine and peroxide curing varnishes or polyurethane varnishes. The pigment may also be present in synthetic, semisynthetic or natural macromolecular substances, such as thermoplastic resins, e.g., polyvinyl chloride, polystyrene, polyethylene, polyesters, phenoplasts, aminoplasts and rubber. The pigment may also be present in admixture with natural, regenerated or synthetic fibers, such as glass, silicate, asbestos, wood, cellulose, acetylcellulose, polyacrylonitrile, polyester, polyurethane and polyvinyl chloride fibers or mixtures of the same, and also in powders, for example organic or inorganic pigments, rock flour, cements, plaster of Paris, starches and wood flour. With the new pigment there are obtained prints, paint and varnish coatings, coverings, shaped articles, such as sheets, threads, plates, blocks, granulates and rods with a brilliant red color of excellent durability.

The mixtures of substances which contain as active coloring ingredient the extremely brilliant yellowish-red new pigment of good hiding power, may be of solid, elastic, pasty, viscous, mobile or thixotropic consistency. They may be obtained by conventional methods. Aqueous pastes may be obtained for example by stirring the pigment into water, possibly with the addition of a wetting or dispersing agent or by stirring or kneading the pigment into a dispersing agent in the presence of water and possibly of organic solvents or oils. These pastes may for example be used for the production of flush pastes, printing colors, distempers, plastic dispersions and spinning solutions. The pigment may also be introduced by stirring, rolling, kneading or grinding into water, organic solvents, non-drying oils, drying oils, lacquers, varnishes, plastics or rubber. Finally, it is also possible to work up the pigment by dry mixing with organic or inorganic masses, granulates, fibrous materials, powders and other pigments, to form mixtures of substances. The pigment dye according to this invention may obviously be used in conjunction with other pigment dyes or soluble dyes. It is moreover eminently suitable for textile printing.

In addition to its excellent hiding power, outstanding purity of shade and good general fastness, such as fastness to light and weathering and solvent and softener resistance, the new pigment is also characterized by superior resistance to high temperatures. For example, in contrast to the modifications hitherto known, the thermal behavior of the new pigment makes it possible to work it into polyamides, for example to spin it therewith, without the shade of color being dulled by the effect of the temperature during working up. The superiority of the new pigment in hiding power and purity of shade is also shown for example in automobile finishes; to achieve the same hiding power, a smaller amount of the new product is required than of the known gamma-modification of quinacridone. The white blend of the new pigment with titanium dioxide moreover exhibits a purer shade of color.

The new pigment may be prepared by various methods. As initial material a quinacridone is used which is as pure as possible and which has been prepared for example by ring closure of 2,5-dianilinoterephthalic acid in polyphosphoric acid. For complete conversion of the resultant conventional alpha, beta and gamma modifications into the new form, these are, for example, dissolved in 5 to 20 times the amount of sulfuric acid, poured into or diluted with water or an alcohol, preferably a low boiling alcohol, for example methanol, ethanol, butanol, glycol or other alcohols boiling up to 200° C., or ground, for example by the known salt milling process, possibly in the presence of solvents, such as alcohols, glycols or preferably N-methylpyrrolidone or other disubstituted carboxylic acid amides, such a dimethylformamide, or ground in such solvents without salt, in order to obtain it in a sufficiently finely divided form, for example with an average mean primary particle size of less than 5 microns length. For industrial reasons, orders of magnitude of 0.1 to 2 microns in length and 0.01 to 0.5 micron in thickness are in general suitable with acicular structures and of less than 0.5 micron edge length in the case of rhombic structures. By "salt milling" we understand the process of grinding dyes and pigments with or without liquids and in the presence of inorganic salts. This process, its conditions, suitable salts and liquids are known to the expert and are published in the pertinent literature.

Material prepared in this or any similar manner is then contacted with N-methylpyrrolidone and in this way converted into the pigment. For this purpose there are suitable amounts of N-methylpyrrolidone of from 0.1 to 50 times the weight of the quinacridone; amounts of 5 to 25 times are preferred. Depending on the amount of the N-methylpyrrolidone, the quinacridone is wetted thereby, made into a paste therewith or suspended therein. The presence of the N-methylpyrrolidone effects the formation of the desired pigment upon standing for example for 1 to 100 hours at temperatures of about 0° to 300° C. The temperature range between 10° and 205° C., especially above 150° C., is preferred. The formation of the pigment can also be promoted by allowing the mixture to boil, possibly under reduced or increased pressure. The formation of the pigment can also be accelerated by stirring, grinding or shearing.

When starting from a prepared material which is present in an especially finely divided form, such as is obtained for example by salt milling or by precipitation of the sulfuric acid solution of the quinacridone and hydrolysis of the sulfate formed, the time required for preparing the pigment is less, about ½ to 4 hours at 200° C. If elevated temperatures are to be avoided, a material must be used which is present in this especially finely divided form. For complete rearrangement, about 50 to 100 hours are then required. By grinding and shearing, the duration of the conversion at room temperature can be diminished to 5 to 20 hours. The new pigment thus formed shows two clearly defined medium lines at 13.1° and 13.3° and is yellowish red.

The new red quinacridone pigment may however also be obtained by a salt milling for 10 to 20 hours in the presence of N-methylpyrrolidone and a water-soluble inorganic salt and also of alkalies by using the dried violet hydrolyzate of the blue sulfate which is formed by precipitation of a 5 to 10% solution of the synthesis product in concentrated sulfuric acid at about 0° to 50° C., preferably at 15° to 20° C., with 0.15 to 2 times, preferably 0.5 to 1 times the amount of methanol (with reference to sulfuric acid). The N-methylpyrrolidone is then preferably used in 0.1 to 10, preferably 0.5 to 5 times the amount of quinacridone. As water-soluble inorganic salts there may be used cheap salts, as for example sodium chloride or sodium sulfate, which are used in 5 to 20, preferably 10 times the amount of quinacridone. As alkalies, which are added with optimum result in 0.1 to 0.5 times the amount, there may be used for example alkali or alkaline earth hydroxides or carbonates. A ball mill is a suitable apparatus for this process.

A form of the pigment which is especially valuable industrially and which is an especially brilliant yellowish red product of good hiding power is obtained when a suction filtration cake of the precipitated quinacridone obtained by dissolution in concentrated sulfuric acid and pouring into ice-water, and washed until neutral, is intimately mixed with 10 to 50 times, preferably 15 to 25 times, the amount (with reference to quinacridone) of N-methylpyrrolidone, freed from water by fractional distillation under normal or reduced pressure and then heated in the residual N-methylpyrrolidone at an elevated temperature until the average mean size of the primary particles is 0.3 to 0.7 micron. A heating period of ½ to 20 hours and a temperature of about 200° C. are favorable but a duration of about 1 to 4 hours is preferred. During this process part of the N-methylpyrrolidone, for example a quarter or third, may be distilled off. The same especially desirable result is also arrived at when the aqueous paste of the precipitated quinacridone is first dried, pulverized and then converted with N-methylpyrrolidone in the said way into the new form; distilling off of the water is then unnecessary. An average mean primary particle size of 0.1 to 2 microns and a specific surface of about 10 to 30 square meters per gram are preferred.

The following examples will further illustrate this invention but the invention is not restricted to these examples. The parts and percentages are by weight.

*Example 1*

20 parts of the yellowish red pigment obtained according to the following paragraph (a) and 20 parts of aluminum hydroxide are ground on a three-roller grinding mill in the usual way with 60 parts of linseed oil varnish. The printing color prepared in this way yields, when used for book or offset printing, lustrous red prints with excellent fastness properties, especially very good fastness to light, and of good hiding power. Prints prepared on sheet metal according to this process are moreover fast to pasteurization.

The pigment is prepared in the following way:

(a) 100 parts of linear-trans-quinacridone with a carbon content of at least 75% (obtained by ring closure of 2,5-dianilinoterephthalic acid in 10 times the amount of polyphosphoric acid with a $P_2O_5$-content of more than 80%) are dissolved at 10° to 20° C. in 1000 parts of concentrated sulfuric acid and precipitated by pouring into 8000 parts of ice-water.

The suction cake obtained by suction filtration is washed free from sulfate and taken up in 2,400 parts of N-methyl-pyrrolidone. The remaining water is fractionally distilled off in a nitrogen atmosphere. Then during three hours 800 parts of N-methylpyrrolidone are removed by distillation while raising the temperature to 200° C. After cooling, the remaining methylpyrrolidone is filtered off by suction, washed with 200 parts of N-methylpyrrolidone and then with methanol in water. The suction cake is dried at 100° C. and then pulverized. The new red pigment of linear-trans-quinacridone is obtained with an average mean primary particle size of 0.5 micron.

(b) The same result is arrived at when the sulfuric acid solution according to (a), paragraph 1, is diluted at 15° to 25° C. with 1000 parts of methanol or is allowed to flow into this amount of methanol, the sulfate thus formed is filtered off by suction, hydrolyzed with water and dilute caustic soda solution, washed free from sulfate and the suction cake treated further as above described.

In the process of Examples (a) and (b), the distilling off of the water from the N-methylpyrrolidone mixture can also be replaced by drying the neutral aqueous paste at 50° C. under reduced pressure and the pulverized quinacridone can then be treated as described with N-methylpyrrolidone.

(c) In a steel vibratory mill of 4 liters' capacity 100 grams of linear-trans-quinacridone and 750 grams of N-methylpyrrolidone are ground for 10 hours in the presence of 12,000 grams of steel balls of 15 mm. diameter. 1,650 grams of N-methylpyrrolidone are added to the ground material and 800 grams thereof distilled off at 200° C. under nitrogen. After cooling, the remaining methyl-pyrrolidone is filtered by suction, washed with 200 grams of N-methylpyrrolidone and boiled up with 1000 grams of 10% sulfuric acid. The pigment, after having been filtered by suction, washed and dried, shows the same X-ray diffraction pattern as that obtained according to (a) or (b).

In the grinding in N-methylpyrrolidone, 1,500 grams of rock salt may be added; it is also possible to grind dry in the presence of this amount of rock salt; in both cases the desired yellowish red pigment is obtained.

(d) 100 parts of crude linear-trans-quinacridone are dissolved at 15° C. in 1100 parts of concentrated sulfuric acid. Within two hours at 15° to 20° C., 550 parts of methanol are allowed to flow in slowly, the blue sulfate is filtered off by suction, washed with a mixture of 100 parts of sulfuric acid and 100 parts of methanol and then with water, taken up in 1000 parts of 1% caustic soda solution, heated to 80° C., filtered by suction while hot, washed neutral with water and dried. 85 parts of a violet powder are obtained.

This powder is ground for 20 hours with the tenth part of sodium carbonate, 10 times the amount of N-methylpyrrolidone and 20 times the amount of sodium chloride in the presence of porcelain balls of 15 mm. diameter in a vibratory mill. The contents are taken up in water, filtered off by suction and the sodium chloride is washed out completely with water. After drying under reduced pressure at 50° C., a yellowish red powder with the X-ray diffraction pattern of the new pigment is obtained.

Example 2

5 parts of the new pigment (for example from Example 1(a)) are ground in a ball mill with a nitrocellulose solution which contains 10 parts of nitrocellulose (alcohol-soluble, low viscosity), 5 parts of dibutyl phthalate, and 80 parts of an ethyl alcohol/ethyl glycol mixture 9:1. A red intaglio printing color is obtained which is suitable for the production of prints which are eminently fast to light and solvents and which do not bleed.

By appropriate modification of this example, especially by increasing the proportion of pigment, an aniline printing color is obtained.

In an analogous way, by appropriate modification, printing pastes for other purposes, for example for textile printing and screen printing, may be obtained.

Example 3

100 parts of a product resulting from mixing linseed oil with the esterification product of phthalic acid and a mixture of glycerin and pentaerythritol are added to 100 parts of xylene and then 8 parts of the new pigment (for example from Example 1(a)) are added; the mass is ground three times in a cone mill. A yellowish red varnish is obtained which is suitable for spraygun application. Coatings thus prepared are characterized by good hiding power, brilliant shade and outstanding light fastness.

Example 4

2 parts of the new pigment (for example from Example 1(b)) are mixed in a ball mill in the usual way with a varnish consisting of 9.5 parts of an ester-soluble nitrocellulose (alcohol-moist), 2.5 parts of dibutyl phthalate, 1.5 parts of benzyl butyl phthalate, 2 parts of a synthetic resin, as for example the product obtained from cyclohexanone by treatment with sodium hydroxide, 16 parts of butyl acetate, 5.5 parts of methyl acetate and 13 parts of pure toluene. Coatings prepared with this varnish are characterized not only by their yellowish red shade but also by good hiding power, and excellent fastness to light and overspraying.

Example 5

8 parts of the new pigment (for example from Example 1(a)) are ground in a cone or ball mill into a stoving lacquer of 40 parts of coconut oil alkyd resin (40% coconut oil), 12 parts of urea formaldehyde resin, 40 parts of xylene and 8 parts of normal butanol. Varnishes may be prepared therewith which after curing by stoving are highly glossy and extremely fast to weathering and overspraying.

Example 6

5 parts of the new pigment (for example from Example 1(c)) are ground by means of a cone mill into 100 parts of a drying unsaturated polyester resin free from paraffin. To the ground product there are added 10 parts of monostyrene and 1 part of cyclohexanone peroxide paste (40% in dibutylphthalate), the whole is thoroughly stirred and finally 4 parts of drier solution (10% cobalt naphthenate in white spirit) and 1 part of silicone oil solution (1% in xylene) stirred in. The mixture is applied to primed wood and a highly glossy, waterproof red coating is obtained which does not lose its brilliance.

Example 7

A mixture of 70 parts of polyvinyl chloride, 30 parts of di-iso-octyl phthalate and 1 part of titanium dioxide (rutile type) are colored in the usual way with 0.5 part of the new pigment (for example from Example 1(b)) on mixing rollers heated to 160° C. An intensely red colored plastic composition is obtained which may serve for example for the production of sheets or sections. The coloration is characterized by outstanding fastness to light and softener.

Example 8

1 part of polystyrene granulate is mixed dry with 1 part of the new pigment (for example from Example 1(c)) in a mixing drum by powerful shaking. The mixture is then homogenized with the aid of a color extruder heated to 180° C. The string extruded from the nozzle of the extruder is comminuted on a cutting machine and the colored granulate thus obtained is molded in an injection molding machine. Brilliant red moldings are obtained having high fastness to light. Polyethylene and polycaprolactam can be colored red in the same way.

Example 9

A rubber mixture of 100 parts of pale crepe, 2.6 parts of sulfur, 1.0 part of stearic acid, 1.0 part of 2-mercaptobenzthiazole, 0.2 part of hexamethylene tetramine, 5.0 parts of zinc oxide, 60.0 parts of chalk and 2.0 parts of titanium dioxide (anatase type) is colored in the usual way on mixing rollers at 50° C. with 2.0 parts of the new pigment (for example from Example 1(c)) and vulcanized for 12 minutes at 140° C. An intensely red colored vulcanizate is obtained.

Example 10

10 parts of the new pigment (for example from Example 1(d)), 60 parts of titanium dioxide (rutile type), 25 parts of lithopone, 15 parts of talc are made into a paste with 30 parts of a wetting liquid (solution of 1% of sodium hexametaphosphate and 3% of a condensation product from sodium 2-napthalene sulfonate and formaldehyde in water) and ground in a ball mill. The paste thus formed possibly while adding more water, is stirred into 100 parts of a commercial polyvinyl acetate dispersion (solids content about 55%). With the resultant binder color, coatings which have excellent fastness to light and wet-wiping are obtained.

Instead of the polyvinyl acetate dispersion there may also be used a commercial self-vulcanizing rubber latex and by dipping suitable molds, thin-walled rubber articles of powerful coloration can be prepared.

Example 11

20 parts of heavy spar are suspended with a solution of 10 parts of aluminum sulfate in 100 parts of water. Then 5 parts of sodium carbonate containing water, dissolved in 50 parts of water and 10 parts of an aqueous dye paste are stirred in which contains 20% of the new pigment (prepared from the N-methylpyrrolidone-moist suction cake from Example 1(a) by treatment with the necessary amount of water). Finally there is added a solution of 12 parts of barium chloride in 120 parts of water, the precipitate deposited is filtered off by suction and the residue washed with water. 20 parts of the paste obtained are mixed with 4 parts of a 20% glue solution. In this way a wallpaper color is obtained which gives wallpaper of very good fastness to light.

Example 12

5 parts of the new pigment (for example from Example 1(d)) are ground in an edge-runner with 100 parts of plaster in the usual way and then adjusted with water to a readily workable mixture. After setting, a red colored plaster is obtained.

Cement can be worked up into a red colored concrete in an analogous way.

Example 13

To 100 parts of bleached sulfite cellulose in a beater there are added in the usual way 2 parts of a 20% aqueous pigment paste which has been obtained directly from the N-methylpyrrolidone-moist suction cake according to Example 1(a) by treatment with the necessary amount of water. Then 3 parts of wood glue and 4 parts of aluminumoxysulfate in powder form are stirred in. After grinding, the whole is worked up on a paper machine. A brilliant red material is obtained.

Example 14

250 parts of a 20% aqueous pigment paste which has been obtained from the N-methylpyrrolidone-moist suction cake from Example 1(a) by treatment with water are made up to 500 parts with water and to this is added a clear solution of 15 parts of resin soap (obtained by boiling colophony with caustic soda solution in the usual way) and 150 parts of water. The suspension of the pigment is uniformly dispersed with a suitable stirrer (for example with rebound and shear action) and then at 40° C. while stirring a solution of 5 parts of calcium chloride in 110 parts of water is slowly added. After stirring for 15 minutes at 60° C., the pigment is filtered by suction at about 50° C., washed in the usual way with water and dried to constant weight at 50° C. under reduced pressure. 55 parts of a red powder are obtained which is composed of about 75% of pigment and 25% of calcium lake of the resin soap. This red powder may be dispersed especially easily in the usual pigment binding agents.

Example 15

120 parts of an aqueous pigment paste containing 40 parts of pure pigment from Example 1(a) and 60 parts of a condensation product from sodium 2-naphthalene sulfonate and formaldehyde have water added to make up the total mixture to 200 parts. This mixture is ground in a ball mill until the pigment has reached the desired degree of fine division. A pigment paste is obtained with a content of about 20% of the new pigment and 30% of dispersing agent, which immediately disperses in aqueous media like ink. It is especially suitable for pigmenting plastic dispersions, rubber latex, binder colors, paste colors, glues, emulsions, paper in bulk, spinnable cellulose xanthate and other aqueous media. Thus for example in Example 10, 50 parts of the above pigment paste may be used instead of the 10 parts of the new pigment. The addition of the wetting liquid is then unnecessary. The above pigment paste may also be used in Example 13.

The pigment paste may however be completely dried, for example in the air, under reduced pressure, at elevated temperature or on a roller drier, and the dy material flaked or finely ground. The pigment preparation with a content of about 40% of the new pigment and 60% of dispersing agent thus obtained behaves just like the original pigment paste described above upon the addition of water.

Example 16

5 parts of the pigment paste from Example 15 are stirred well with 45 parts of water. This pigment suspension is added to about 2000 parts of a spinnable cellulose xanthate solution which contains 100 parts of cellulose. After the pigment has been uniformly dispersed in the xanthate solution by stirring, the solution is spun in the usual way. Brilliant yellowish red threads of high uniformity of shade are obtained. Instead of the pigment paste, there may also be used 2.5 parts of the dried pigment preparation.

If a dispersing agent soluble in acetone is used for producing the pigment preparation, red spin-dyed acetyl cellulose fibers may be prepared in an analogous way.

What we claim is:

1. A process for the production of a yellowish-red pigment dye as a new form of the gamma-modification of 7,14 - dioxo - 5,7,12,14 - tetrahydroquinolino - (2,3-b) - acridine in an average mean primary particle size of more than 0.1 micron and with a specific surface of less than about 30 square meters per gram, which process comprises contacting 7,14-dioxo-5,7,12,14-tetrahydroquinolino-(2-3-b)-acridine in a state of fine division with N-methylpyrrolidone until said 7,14-dioxo-5,7,12,14-tetrahydroquinolino-(2,3-b)-acridine is converted to a new crystalline form having a X-ray diffraction pattern exhibiting at a double glancing angle of 6.5°, 13.7° and 26.4° three powerful lines, at 13.1°, 13.3°, and 23.8° three medium lines, and at 17.0°, 20.5° and 25.0° three weak lines.

2. A process as claimed in claim 1 wherein the conversion is conducted at a temperature between about 150° C. and 300° C.

3. A process as claimed in claim 1 wherein the 7,14-dioxo - 5,7,12,14 - tetrahydroquinolino - (2,3-b)-acridine used for the conversion is one derived by precipitation thereof from a sulfuric acid solution by means of a liquid selected from the group consisting of water and a low boiling alcohol.

4. A process as claimed in claim 3 wherein methanol is used for the precipitation.

5. A process as claimed in claim 4 wherein the precipitated dye is converted in the presence of N-methylpyrrolidone, a water-soluble inorganic salt and alkali.

6. A process as claimed in claim 1 wherein the 7,14-dioxo - 5,7,12,14 - tetrahydroquinolino - (2,3-b)-acridine used for the conversion has been prepared prior thereto by grinding it in the presence of a water-soluble inorganic salt.

7. A process as claimed in claim 1 wherein the 7,14-dioxo - 5,7,12,14 - tetrahydroquinolino - (2,3-b)-acridine used for the conversion has been prepared prior thereto by grinding it in the absence of a water-soluble inorganic salt.

References Cited in the file of this patent

UNITED STATES PATENTS

| 2,844,484 | Reidinger et al. | July 22, 1958 |
| 2,844,485 | Struve | July 22, 1958 |